United States Patent
Pereira Masiero (10) Patent No.: US 10,046,415 B2
(45) Date of Patent: Aug. 14, 2018

(54) TOOL AND METHOD FOR REMOVING GAS HYDRATES FROM THE SURFACE OF SUBSEA OIL AND GAS EXPLORATION AND PRODUCTION EQUIPMENT THROUGH LASER RADIATION

(71) Applicant: Leone Pereira Masiero, Rio de Janeiro (BR)

(72) Inventor: Leone Pereira Masiero, Rio de Janeiro (BR)

(73) Assignees: WSN SISTEMAS DE MONITORAMENTO LTD, Jardim Primavera RJ (BR); ALIS SOLUÇÕES EM ENGENHARIA LTD, Rio de Janeiro-RJ (BR)

( * ) Notice: Subject to any disclaimer, the term of this patent is extended or adjusted under 35 U.S.C. 154(b) by 475 days.

(21) Appl. No.: 14/436,553

(22) PCT Filed: Oct. 18, 2013

(86) PCT No.: PCT/BR2013/000430
§ 371 (c)(1),
(2) Date: Apr. 17, 2015

(87) PCT Pub. No.: WO2014/059501
PCT Pub. Date: Apr. 24, 2014

(65) Prior Publication Data
US 2016/0167168 A1    Jun. 16, 2016

(30) Foreign Application Priority Data

Oct. 18, 2012 (BR) .............................. 102012026743

(51) Int. Cl.
*B23K 26/122* (2014.01)
*B23K 26/16* (2006.01)
(Continued)

(52) U.S. Cl.
CPC .......... *B23K 26/122* (2013.01); *B08B 7/0042* (2013.01); *B08B 9/023* (2013.01);
(Continued)

(58) Field of Classification Search
CPC ..... B08B 7/0042; B08B 7/0071; B08B 9/023; B23K 26/0054; B23K 26/046;
(Continued)

(56) References Cited

U.S. PATENT DOCUMENTS

| 4,456,067 A | 6/1984 | Pinner, Jr. |
| 5,049,762 A * | 9/1991 | Katoh ...................... G02B 7/00 359/332 |

(Continued)

*Primary Examiner* — Tu B Hoang
*Assistant Examiner* — Vy Nguyen
(74) *Attorney, Agent, or Firm* — Malin Haley DiMaggio & Bowen, P.A.

(57) ABSTRACT

A tool and related method for removing unwanted gas hydrates from the surface of equipment used in subsea exploration and production. The tool includes a main vessel and a power cable linked together by a connector. Inside the vessel a laser device is connected to an adjustable focus collimator by a cable, with the wavelength emitted by the laser being between 200 nm and 930 nm. When the radiation reaches the subsea exploration equipment it causes the heating thereof, which in turn heats the hydrate through conduction, breaking down the hydrate formation from the inside out. The front lid of the tools includes a window fitted with anti-reflection film that forms an interface between the vessel and the aqueous medium.

6 Claims, 5 Drawing Sheets

(51) Int. Cl.
*B08B 7/00* (2006.01)
*B08B 9/023* (2006.01)
*F17D 1/05* (2006.01)
*E21B 36/00* (2006.01)
*E21B 41/00* (2006.01)
*B23K 26/00* (2014.01)
*B23K 26/046* (2014.01)
*B23K 26/36* (2014.01)
*B23K 26/12* (2014.01)

(52) U.S. Cl.
CPC ........ *B23K 26/0054* (2013.01); *B23K 26/046* (2013.01); *B23K 26/1224* (2015.10); *B23K 26/16* (2013.01); *B23K 26/36* (2013.01); *E21B 36/00* (2013.01); *E21B 41/0007* (2013.01); *F17D 1/05* (2013.01); *B08B 7/0071* (2013.01)

(58) Field of Classification Search
CPC ... B23K 26/122; B23K 26/36; E21B 41/0007; F17D 1/05
USPC .............. 219/121, 600–800; 175/16; 166/65; 242/159; 385/80–99; 134/1–200; 405/100–200
See application file for complete search history.

(56) References Cited

U.S. PATENT DOCUMENTS

| | | | | |
|---|---|---|---|---|
| 5,198,915 | A * | 3/1993 | Watson | G03H 1/10 |
| | | | | 359/10 |
| 5,593,605 | A * | 1/1997 | Jones | B23K 26/106 |
| | | | | 219/121.63 |
| 6,015,929 | A | 1/2000 | Rabeony et al. | |
| 6,437,285 | B1 * | 8/2002 | Thomas | B08B 7/0042 |
| | | | | 219/121.68 |
| 9,327,810 | B2 * | 5/2016 | Zediker | B63G 8/001 |
| 2007/0267220 | A1 * | 11/2007 | Magiawala | E21B 7/14 |
| | | | | 175/12 |
| 2009/0205675 | A1 * | 8/2009 | Sarkar | B08B 7/0042 |
| | | | | 134/1 |
| 2009/0230104 | A1 * | 9/2009 | Domec | B23K 9/0282 |
| | | | | 219/121.78 |
| 2013/0011102 | A1 * | 1/2013 | Rinzler | G02B 6/3813 |
| | | | | 385/89 |
| 2016/0251940 | A1 * | 9/2016 | De Witt | E21B 37/00 |
| | | | | 166/304 |

* cited by examiner

TOOL AND METHOD FOR REMOVING GAS HYDRATES FROM THE SURFACE OF SUBSEA OIL AND GAS EXPLORATION AND PRODUCTION EQUIPMENT THROUGH LASER RADIATION

CROSS REFERENCE TO RELATED APPLICATIONS

This application claims priority to PCT Application No. PCT/BR2013/000430, filed on Oct. 18, 2013, which claims priority to Brazilian Patent Application No. BR 10 2012 026743-8 filed on Oct. 18, 2012.

STATEMENT REGARDING FEDERALLY SPONSORED RESEARCH OR DEVELOPMENT

N/A

BACKGROUND OF THE INVENTION

Field of the Invention

This invention belongs to the field of subsea intervention tools for removing gas hydrate formations on the surface of equipment and connections used in oil exploration and production, more specifically, a tool for removing gas hydrate formations through high power laser beam radiation applied to the surfaces of the subsea equipment.

Description of Related Art

Oil and oil products play a leading role in industry. Oil is typically drawn from wells and shipped by pipeline. Depending on the location of the well and the destination of the oil, pipelines may be either onshore or offshore.

The flow of oil through a pipeline may result in the generation of different substances that block the flows of fluids. Thus, there may be a build-up of paraffin waxes, gas hydrates or other accretions of assorted materials, such as gravels or sand in the pipeline.

Furthermore, due to the low temperatures that prevail in the deep waters where oil is extracted, items of equipment used for oil drilling and production may be subject to external encrustations of matter such as gas hydrates resulting from leaks of light fractions of hydrocarbons which, under high pressures and at low temperatures (typically 4° C.), result in the formation of gas hydrates.

Gas hydrate or clathrate (which means 'cage' in Latin) is a crystal compound in which water molecules clump together with others, bonded with hydrogen, encapsulating molecules of gas such as methane and carbon dioxide. This type of intermolecular bonding is similar to the structure of ordinary ice, but the geometric arrangement produces cavities around gases that were originally held in solution in the water. Despite the absence of chemical bonds between the host (water) and guest (methane etc.), the stable structure of this clathrate means that when this substance is in a solid state, it does not melt at even temperatures well above 0° C., providing that the prevailing pressure and gas concentration are sufficiently high. These conditions are found in marine sediments along continental shelves at depths of more than around 500 meters. The guest molecule most commonly found in offshore gas hydrates is methane ($CH_4$); the heavier hydrocarbons and molecules such as $CO_2$ and $H_2S$ normally occur in proportions of less than 2%. While $CO_2$, $H_2S$ and $C_2+$ increase the fragmentation temperature of clathrate, the presence of salts dissolved in the water reduces its stability.

Gas leaks may occur in subsea oil exploration and production equipment (including light fractions of oil and other gases), seeping from these items of equipment. When gas leaks come into contact with moisture in the low temperatures and high pressures of a marine environment, this results in the formation of gas hydrates.

Laser sources generate laser light that is transferred to an optical head, comprised of optical elements such as lenses, windows, collimators etc. This laser light may be steered to this head by an optic fiber or any other wave guide able to steer the laser light. The optic fiber may be built into a coil or an umbilical.

The field presents some documents describing the use of laser tools for removing blockages from the inside of subsea pipelines carrying oil, with such blockages being caused by matter such as paraffins, gas hydrates and other substances inside or outside such pipeline.

Thus, U.S. Pat. No. 6,437,285 addresses a method and system for treating material covering the inner surface 52 using a pulsed laser ray 38. A laser source generates laser rays that are transferred to a laser head 100. A set of mirrors 380 in the head 100 distributes laser ray pulses in a circle 610 around the axis 54 of the head 100 and directs them towards the matter on the inner surface. Although this US Patent document addresses the removal of matter from the surfaces of offshore equipment by laser, the focus of the treatment is only the inner surface of the pipelines.

Republished U.S. Pat. No. RE33,777 addresses a process for removing matter with low heat conductivity, such as paint, grease, ceramics and similar, from a substrate through ablation without damaging the substrate. This process involves subjecting the matter to be removed to laser ray pulses or their equivalent at wavelengths whereby the matter to be removed is opaque to this wavelength, at a flow rate sufficient to break down the matter to be removed without causing any type of damage to the substrate or its surface. Claim 1 in this document defines the laser ray pulses as having duration greater than some three microseconds and less than some four thousand microseconds, with a repetition rate greater than one and less than around one thousand pulses per second.

In contrast, this application addresses the use of non-pulsed laser light, meaning continuous wave (CW), removing the matter through heating rather than by ablation, as set forth in U.S. Pat. No. RE33,777. The intensity of the laser light is controlled in order to maintain the equipment surface temperature at appropriate levels, avoiding any damage thereto.

This document explains that the selected wavelengths are those absorbed by the hydrate. When absorbing the radiation at a wavelength to which the hydrate is opaque, the hydrate formation or another substance is heated, resulting in its fragmentation, although when the hydrate or other substance breaks away from the outside towards the inside, there is a significant exchange of heat with the aqueous medium, thus imposing heavier energy demands.

In contrast, this application considers the water absorption spectrum, as well as the type of hydrate in question, in order to select the wavelength at which the fragmentation will occur with greater efficiency and less energy consumption. By selecting the wavelength to which the water and the hydrate are transparent or semi-transparent, the laser radiation spreads until meeting up with an opaque obstacle, which in this case will be the equipment or pipe in which the gas leak is occurring that gives rise to the hydrate. When reaching the equipment or pipe, the radiation will result in the heating in thereof, which in turn heats up the hydrate through conduction, breaking down the hydrate formation from the inside out.

Moreover, the U.S. Pat. No. RE33,777 document does not mention any anti-reflection coating on the system window that is in contact with the marine medium, matching the refraction index to that of the seawater as a way of obtaining maximum energy transmission, nor does it mention any optimization of the laser ray wavelength used in order to obtain maximum efficiency for removing matter such as gas hydrate or paraffin from the outer surface of subsea equipment.

The application of published US Patent. 20090205675A1 addresses an upgraded method and system for removing blockages from pipelines carrying hydrocarbons. As set forth in the technology addressed by this document, a laser head is placed in a pipeline carrying hydrocarbons that requires cleaning. The laser head is fitted with a laser ray. The laser head directs the laser ray to the portion of the pipeline to be cleaned. The laser source is linked optically through the laser head. The laser source is positioned in a transporter vehicle.

Although this document refers specifically to the use of laser radiation for the removal of unwanted matter such as paraffin or gas hydrates from the outer surfaces of pipelines carrying hydrocarbons, there is no mention of any anti-reflection coating on the tool window that is in contact with the marine medium, nor any other optimization of the laser wavelength used in order to obtain maximum efficiency for the removal of matter such as gas hydrate or paraffin from the outer surface of the subsea equipment.

Consequently, the documents constituting the state of the art generally address removal of blockages from the inside the pipes, and/or use lasers whose radiation is not optimized, as is the case with this tools and its associated method.

SUMMARY OF THE INVENTION

In general, the tool (100) for removing gas hydrates from subsea oil exploration and production equipment by laser rays addressed by the invention comprises:

a) A main vessel (1) as its housing;

b) A power cable (2) to be inserted in the vessel (1) through a first lid (9), with the vessel (1) and the cable (2) being linked together by a connector (3) and inserted into the vessel (1), c) A laser device (15) connected to an adjustable focus collimator (4) by an optic cable (12), the wavelength emitted by the laser device (15) and as the water and the hydrate are transparent or semi-transparent thereto, and with the wavelength being between 200 nm and 930 nm, thus allowing operating flexibility through being able to operate at a considerable distance away from the object in question, while on the other hand, when the radiation reaches the subsea exploration equipment it causes it to heat up, which in turn heats up the hydrate through conduction, breaking down the hydrate formation from the inside out;

d) in a second lid (14) is a window (5) forming an interface between the vessel (1) and the aqueous medium, with the window (5) being fitted with anti-reflection film (6) matching the refraction index with the medium (air 1.00029 or nitrogen 1.00028) inside the vessel (1) and anti-reflection film (7) matching the refraction index of the medium (sea water 1.35+ or − variation of 0.02) outside the vessel (1).

Alternatively, the laser device (15) is placed outside the vessel (1). The vessel (1) is generally cylindrical due to ease of construction, not being limited shape, but must be constrained only by the possible ways of assembling the laser (15) and the collimator (4).

And the method for removing unwanted gas hydrate formations from subsea oil exploration and production equipment using the laser tool (100) addressed by the invention, which consists of steering the tool, carried by an ROV or similar device close to the surface with the unwanted gas hydrates formation to be removed and directing the laser light generated by the laser device (15) for the length of time required to remove the gas hydrate formation from the surface of the subsea device, whereby the device is unlocked, unblocked or is returned in some other manner to its optimum operating conditions, being freed from unwanted gas hydrate formation through heating its structure by laser radiation that in turn breaks down the hydrate through heat conduction.

The invention thus provides a tool for removing gas hydrates from subsea oil exploration and production equipment by laser rays that involve a the use of wavelengths in a specific range in order to optimize the efficiency of the energy generated for dissolving the hydrate.

The invention additionally provides a tool where the window between it and the marine surroundings is fitted with anti-reflection coatings in order to match the refraction indexes that reduce or eliminate light reflections.

The invention also provides a method for removing gas hydrates from subsea oil exploration and production equipment using laser rays through the use of the developed tool.

DETAILED DESCRIPTION OF THE INVENTION

Although the use of the tool addressed by this invention is described for the removal of gas hydrates as the main purpose of such subsea intervention, this tool is equally useful for removing other accretions that may be blocking, locking or hampering in any other manner whatsoever the movement and functioning of the outer parts of subsea structures subject to low temperatures and high pressures, meaning parts of equipment that are in contact with an aqueous medium, such as in the sea or lakes. Thus paraffin accretions are also removed through the use of the tool in question, by merely adapting the wavelength range to the desired purpose.

The tool addressed by this invention is deployed for subsea interventions conducted to remove external gas hydrate formations from equipment and connections used in subsea oil exploration and production such as Vertical Connection Modules (VCM), Subsea Control Modules (SCM), Wet Christmas Trees (WCT), cleaning manometers etc.

The purpose of this invention is to provide a tool that can break down hydrate formations that build up on the outside of subsea oil exploration and production equipment at low temperatures and high pressures.

Hydrate is stable only at low temperatures and under high pressure, and its removal, even at high pressure, is possible through heating it to temperatures of around 30° C. As set forth in this invention, heating is achieved through the radiation emitted by the high-power laser tool applied to the outer areas in order to remove the hydrate in order to unlock, unblock and clean the equipment or structure in question.

Achieving this goal takes place through heating the gas hydrate formation by heat transfers through heat conduction between the equipment heated by laser radiation and the hydrate.

In order to heat the subsea equipment on whose surface the unwanted gas hydrate formation occurs, which will subsequently transfer this heat to the gas hydrate, laser radiation is used, provided by a laser source which transmits its light in a selected specific wavelength range, at which the water and the hydrate are transparent or semi-transparent.

As will be demonstrated below in this report, the wavelength range meeting this condition is between 200 nm and 930 nm.

The invention will be described below, through reference to the Figures appended hereto.

Figure 1:
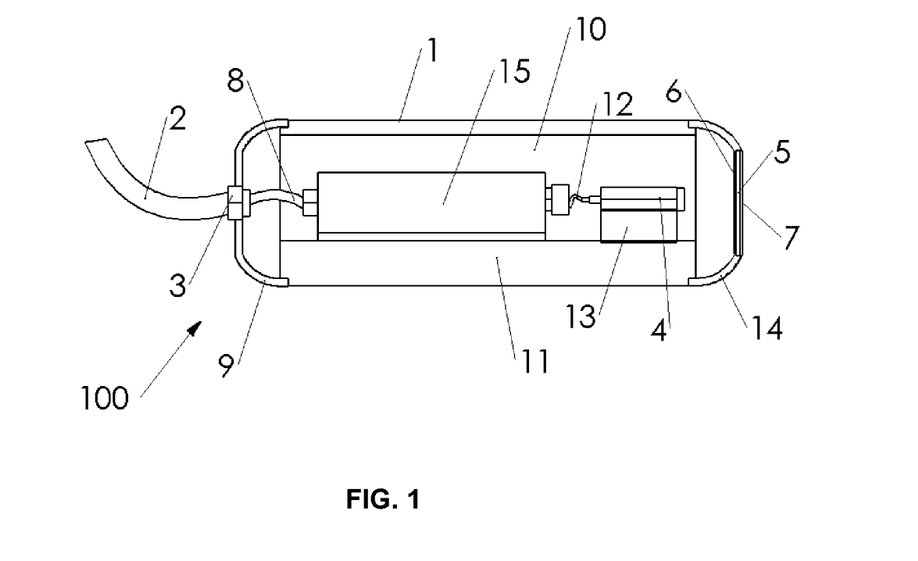
FIG. 1 is a cross-section view of the tool as set forth in the invention.

The laser source radiation is inserted in the tool as set forth in the invention, as illustrated in FIG. 1.

As shown in FIG. 1, the tool addressed by this invention for the removal of unwanted gas hydrates from the surface of equipment used in subsea exploration and production, generally designated by the number (100), comprises:

a) A main vessel (1) as its housing;

b) A power cable (2) to be inserted in the vessel (1) through a first lid (9), with the vessel (1) and the cable (2) being linked together by a connector (3); and inside the vessel (1) is c) A laser device (15) connected to an adjustable focus collimator (4) by a cable (12), with the wavelength emitted by the laser and as the water and the hydrate are transparent or semi-transparent thereto, and with the wavelength being between 200 nm and 930 nm, thus allowing operating flexibility through being able to operate at a considerable distance away from the object in question, while on the other hand, when the radiation reaches the subsea exploration equipment it causes it to heat up, which in turn heats up the hydrate through conduction, breaking down the hydrate formation from the inside out; and d) in a second lid (14) is a window (5) forming an interface between the vessel (1) and the aqueous medium, with the window (5) being fitted with anti-reflection film (6) matching the refraction index with the medium (air 1.00029 or nitrogen 1.00028) inside the vessel (1) and anti-reflection film (7) matching the refraction index of the medium (sea water 1.35+ or − variation of 0.02) outside the vessel (1).

FIG. 1 illustrates one embodiment of the invention in which the laser device (15) and the collimator (4) are contained in the vessel (1). In this case, the tool (100) is fully submersed in the marine medium.

The vessel (1) is generally cylindrical as is usual in state-of-the-art laser tools, generally made from stainless steel or some other steel alloy used in subsea tools, of a size allowing it to access the parts of the subsea equipment to which the laser light will be directed. Gas such as air or nitrogen circulates in the vessel (1).

The cable (2) is a reinforced subsea cable comprised of electrical cables or electrical and optical cables, with the fibers having a core diameter appropriate to the optical power to be transmitted, generally 100 □m to 800 □m.

The connector (3) is a subsea electrical or electrical-optical connector used in conventional applications for subsea equipment, with or without metal, epoxy or ceramic reinforcement.

In one embodiment of the invention, the window (5) of the second lid (14) is a lens serving as an interface between the tool (100) and the marine surroundings, and in order to reduce or eliminate light reflections, it is covered with at least one or preferably two anti-reflection films, known in the state of the art as an AR coating.

In another embodiment of the invention, the window (5) of the second lid (14) is a flat window serving as an interface between the tool (100) and the marine surroundings. In this case, two anti-reflection films are also used.

The window (5) is generally comprised of material that is highly transparent to light at the selected wavelength, including silicon dioxide or calcium fluoride or magnesium fluoride or borosilicate (N-BK7). The anti-reflection films are selected in order to match the refraction index of the inside medium (6) meaning the gas circulating in the vessel (1) and the outside medium (7) in order to match the marine medium.

The laser device (15) with an adjustable focus collimator (4) is a compact laser, generally a semiconductor, with a horizontal or vertical cavity, with the latter case possibly having a set of parallel cavities whose beams are directed through lenses towards a lens for the collimation of the output beam.

Alternatively, the beams are directed through lenses to a plurality of lenses and, due to the high optical power and the intention of maximizing energy efficiency, all the surfaces along which the laser light runs must be treated with anti-reflection films.

In an embodiment of the invention, the laser device (15) is connected to a fiber optic cable (not shown) with a core diameter appropriate to the optical power to be carried thereby, generally between 100 □m and 800 □m.

In another embodiment, the laser device (15) is not connected to a fiber optic cable.

FIG. 1 also illustrates the following items that comprise the tool (100): (8)—Internal electrical or electrical-optical cabling; (9)—First lid for closing the vessel (1) and insertion of the cable (3); (10)—Volume V to be filled with air or nitrogen; (11)—Base for the assembly and dissipation of the laser device (15); (12)—Fiber optic cable connecting the laser (15) to the collimator (4); (13)—Base for the assembly of the collimator; and (14)—Second lid for closing the vessel (1), the lid being fitted with a window (5).

Figure 2:
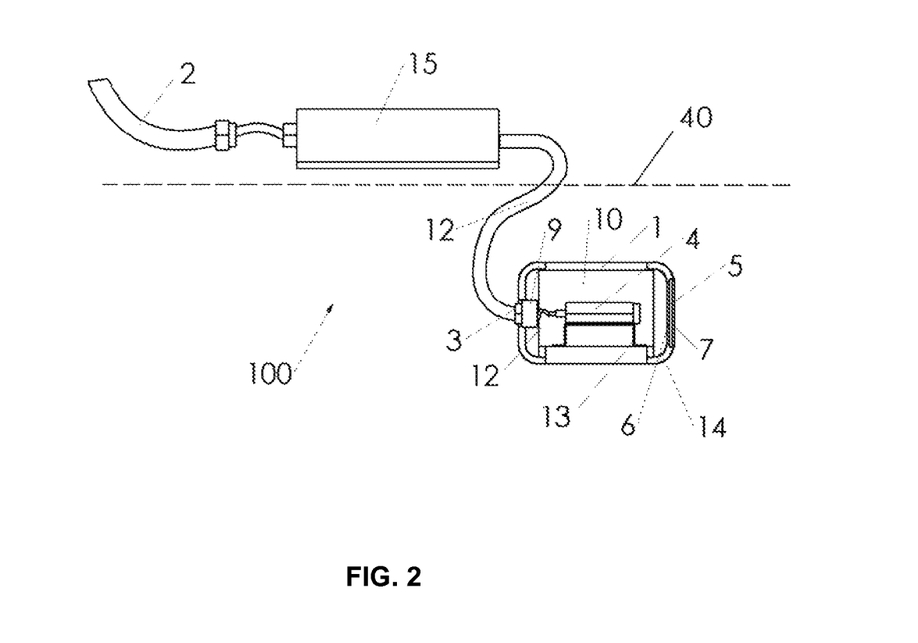
FIG. 2 is a cross-section view of the tool as set forth in the invention with the laser outside the subsea vessel.

FIG. 2 illustrates an embodiment of the tool (100) addressed by the invention in which the laser device (15) is positioned outside the vessel (1) and close to the waterline (40) of the marine medium and the collimator (4) is inserted in the vessel (1) and submerged in the marine medium. The laser (15) and the collimator (4) are still connected by the cable (12). All the other components of the tool (100) are described in FIG. 1.

Figure 3:
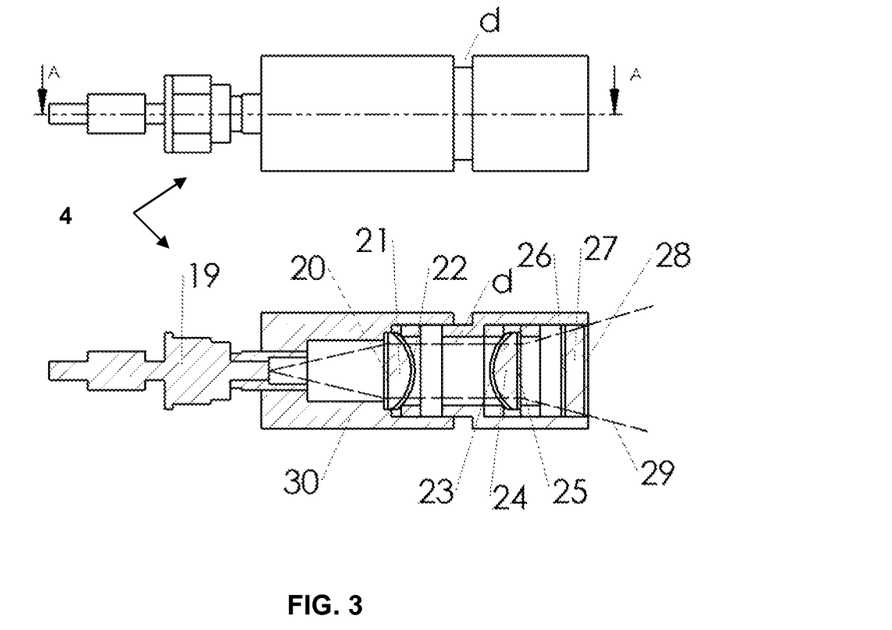
FIGS. 3, 4 and 5 are cross-section views of the collimator of the tool addressed by this invention, being adjusted for divergent, collimated or parallel and convergent beams respectively.
Figure 4:
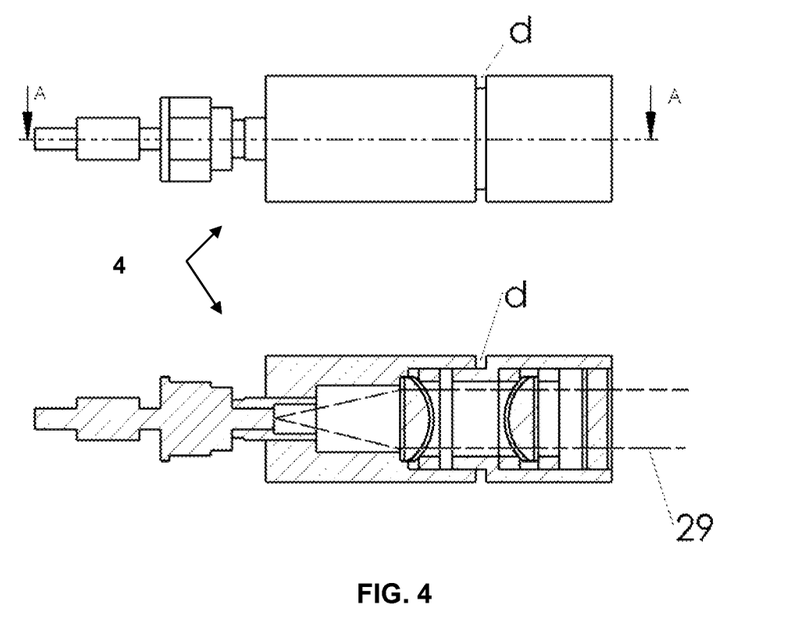
Figure 5:
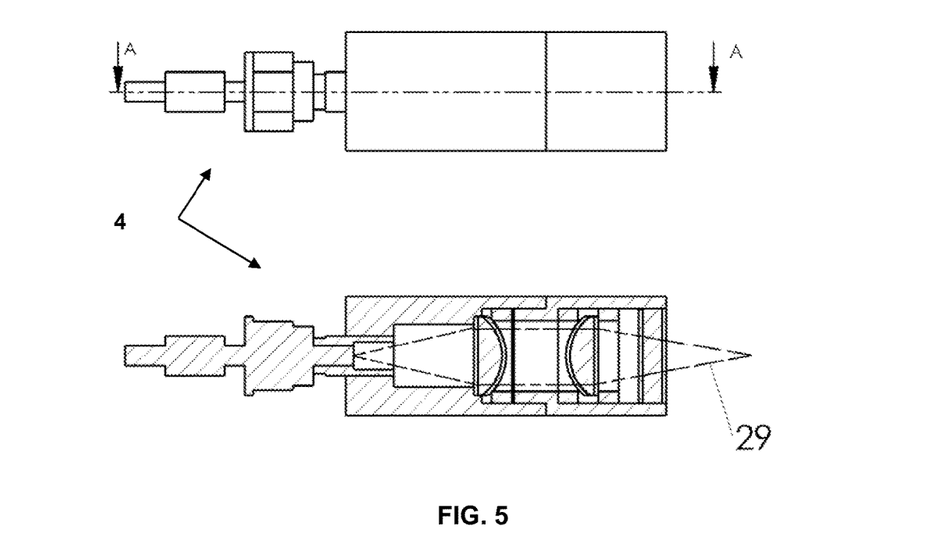

As set forth in FIGS. 3, 4 and 5, the laser beam (15) is collimated by a set of lenses, generally an adjustable focus collimator (4), that will direct the beam and adjust the focus with the possibility of adjusting the beam through an outlet, either divergent (FIG. 3), collimated or parallel (FIG. 4), or convergent (FIG. 5).

The distance "d" between the two lenses of the collimator is illustrated in FIGS. 3, 4 and 5. The adjustment of distance "d" alters the focal ratio of the selected set of lenses, where the focal ratio is given by the Halley equation for lenses. Thus, for a given set of lenses, by altering distance "d" it is possible to adjust the light beam, whereby it emerges as convergent, collimated or divergent.

In these Figures, the optical connector (19) is a connector for linking the fiber optic cable to the collimator, normally Subminiature Metal Version A (SMA) type, not being limited thereto.

Any of the types of optical connectors available on the market, such as Ferrule Connector (FC), Subscriber Connector (SC), Lucent Connector (LC) etc., may be used for the purposes of this invention.

In the collimator (4), the anti-reflection films (20), (22), (23), (25, 26) and (28) are fine films coating the lenses and windows, matching the refraction index of the medium (air 1.00029 or nitrogen 1.00028) inside the vessel (1).

The lenses (21) and (24) are lenses generally made from silicon dioxide or calcium fluoride or magnesium fluoride or borosilicate (N-BK7), arrayed in a manner whereby they direct, focus, diverge or collimate the laser light beam, in order to reach a specific target area to be heated.

The beam (29) is the laser light, focused, collimated or irradiated in order to cover a region larger than its collimation beam, meaning with controlled scatter, through adjusting the distance "d" in the collimator body (4).

The body (30) is a body or structure of the collimator itself, generally made from steel and cylindrical in shape, with adjustment of the distance "d" allowing focal adjustment and collimation of the beam.

Alternatively, the laser (15) may be in another compartment (not shown), another vessel (not shown) or even on the surface as in FIG. 2, with the light being guided through a fiber optic cable to the vessel (1) of the tool (100), where only the collimator (4) is found, described.

In one embodiment of the present invention, the tool (100) is manipulated by an ROV (not shown) or other item of equipment used for subsea interventions.

The tool (100) is marinized and designed to operate under high pressures in low temperature environments.

The tool (100) is designed whereby the irradiated laser beam is collimated and thus does not spread, thus being able to access the target to be heated at a specific distance. This is achieved through arraying the collimator lenses specified for this purpose in the wavelength being used, as illustrated in FIGS. 3, 4 and 5.

Alternatively, this or some other system with an array of lenses fitted with movement controls for altering the focal distance may be used to open or close the beam, thus altering the density of the irradiated power in the area, as well as the area reached by the beam. Through this focusing system, it is possible even with the ROV motionless (not shown), to alter the area and density of the power focused on the matter, thus optimizing the fragmentation process and avoiding the possibility of damaging the subsea equipment through overheating a specific region.

Alternatively, this tool may be associated with a manipulation tool (not shown), mounted on a ROV whereby the hydrate formation is weakened through laser radiation and the ancillary tool can away break or scrape away the hydrate (not shown).

In contrast to the state of the art, the tool (100) addressed by this invention uses a laser device (15) that emits a radiation at selective wavelength in order to optimize the energy efficiency of the light emitted and maximize the power transmitted to the outside environment.

The energy efficiency of the emitted light is also fine-tuned through well-judged use of anti-reflection films, especially on the window (5) of the tool (100).

Thus, the combination of these two characteristics allows the removal of gas hydrates from subsea equipment with enhanced efficiency compared to similar devices constituting the state of the art.

Thus, as set forth in the concept addressed by the invention, radiation from a laser source runs through the gas hydrate formation and heats up the material (metal or composite) of the subsea equipment, using the hydrate as heat insulation, and thus breaking down the unwanted formation from the inside outwards, with enhanced efficiency compared to tools that do not use laser wavelengths at which the hydrate and the water are transparent or semi-transparent.

This enhanced efficiency is due to low heat exchanges between the marine environment and the gas hydrate formation or some other unwanted formation. Part of the radiated energy absorbed by the hydrate is also transformed into heat, helping the pre-heating thereof.

Like all materials, hydrate is endowed with electromagnetic properties that define the transmission, absorption and reflection spectrum of waves of this type. Consequently, the selection of the laser radiation wavelength directly affects the manner and efficiency with which the hydrate is fragmented.

In scientific literature, as well as in patents, the selected wavelengths are those absorbed by the hydrate. When absorbing radiation at a wavelength to which the hydrate is opaque the hydrate formation is heated, resulting in its fragmentation, although when the hydrate breaks away from the outside to the inside, there is a massive exchange of heat with the aqueous medium, thus imposing heavier energy demands.

This application already considers the water absorption spectrum, as well as the type of gas forming the hydrate in question (FIG. 8) in order to select the wavelength at which laser radiation may be transmitted through the water and the hydrate without considerable losses, meaning that the fragmentation takes place with greater efficiency and lower energy consumption.

By selecting a wavelength at which the water and the hydrate are transparent, the laser radiation spreads until it meets an opaque obstacle, which in this case will be the equipment or pipe with the gas leak giving rise to the hydrate. When the radiation reaches the equipment or pipe, it will result in the heating thereof, in turn heating the hydrate through conduction and breaking down the hydrate formation from the inside out.

Figure 6:
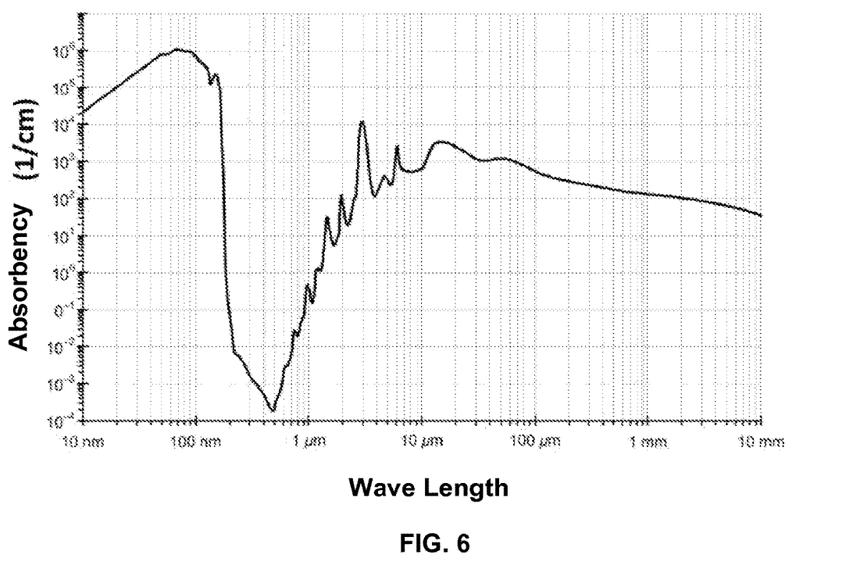
FIG. 6 is an electromagnetic radiation absorbance spectrum in the water.
Figure 7:
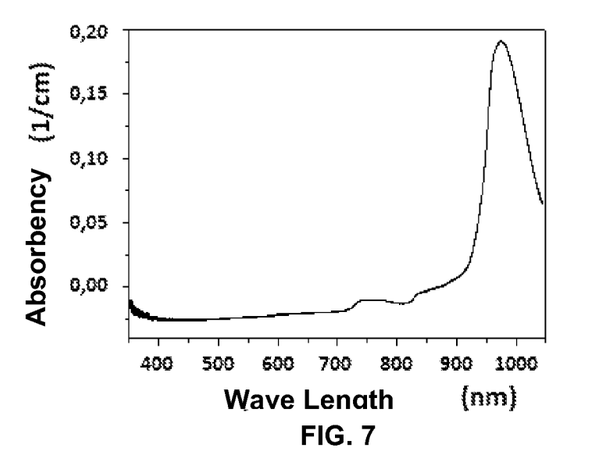
FIG. 7 is a light absorbency spectrum (visible and infrared, close and medium) in the water.

Observing the absorption spectra of the water presented in FIGS. 6 and 7, it is noted that the wavelengths arrayed at between 200 nm and 930 nm have absorbencies of less than 0.1 dB/cm, which allows the radiation of the beam over tens of centimeters with little loss into the marine environment.

Figure 8:
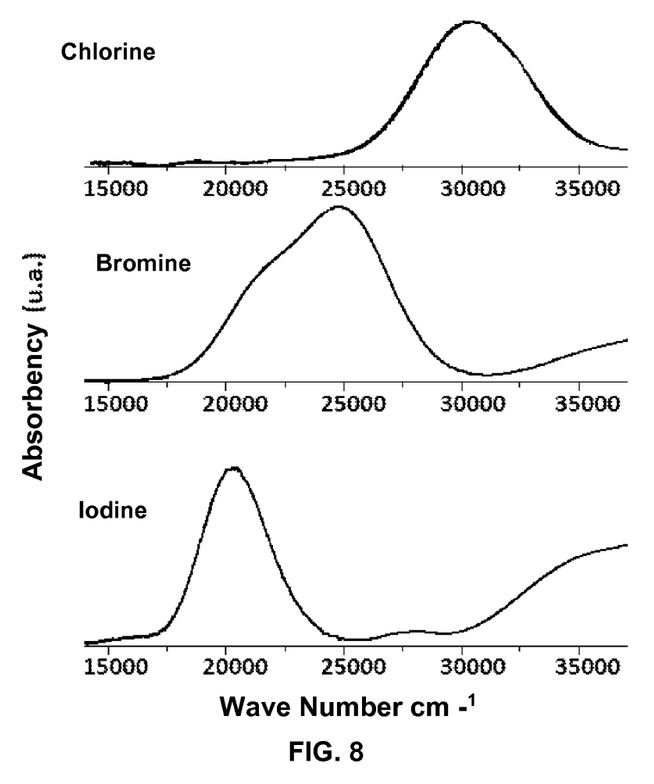
FIG. 8 shows electromagnetic radiation absorption spectra in three different types of hydrates: chlorine, bromine, and iodine.
Figure 9:
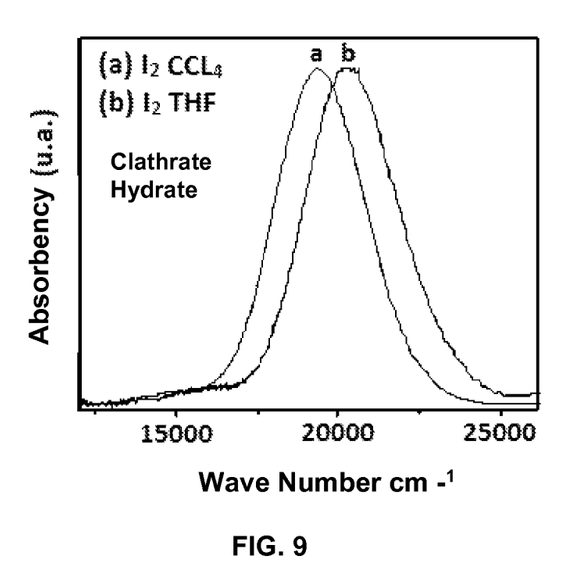
FIG. 9 shows electromagnetic radiation absorption spectra in the hydrate $I_2$/THF (Curve A) and $I_2$/$CCl_4$ (Curve B).

With regard to the hydrate absorption spectrum, FIGS. 8 and 9 show that even for different types of hydrates, the absorption values are below 17500 $cm^{-1}$ by wave number, which corresponds to values of greater than 571 nm.

Noting the absorption values of the water and the hydrates, it is apparent that the wavelength range between 200 nm and 930 nm is endowed with less global absorption (water and gas hydrate), being thus the most recommended for attaining the objectives addressed by this application.

Based on the determination of a wavelength range that complies with the criteria set forth above, absorption in the aqueous medium will be as low as possible, optimizing energy transfers to the hydrate fragmentation process.

As gas hydrate is transparent or semi-transparent for the selected wavelength, most of the radiation is focused on the equipment or pipe from which the hydrate should be removed. Normally metal or composite, the material of the equipment in question will start to heat up, breaking up the hydrate from the inside outwards.

The main advantage of the tool (100) addressed by the invention is that the hydrate on the outer side serves as heat insulation for the aqueous medium, which has a high heat exchange rate. As a result, the maximum amount of energy is used for breaking up the hydrate as, by heating almost only the inner portion of the gas hydrate formation, the process releases little heat into the marine medium through heat conduction. Part of the irradiated energy that may be minimally absorbed by the hydrate is also transformed into heat, helping with the pre-heating thereof (as in the preceding patents), with no significant wasted energy.

With regard to the method addressed by the invention for the removal of gas hydrates from the surface of subsea oil and gas exploration and production equipment through the use of a laser tool (100), which consists of steering the tool, carried by an ROV or similar device, close to the surface with the unwanted gas hydrates formation to be removed and directing the laser light generated thereby for the length of time required to remove the gas hydrate formation from the surface of the subsea device, whereby the device is unlocked, unblocked or is returned in some other manner to its optimum operating conditions, being freed from unwanted gas hydrate formation through heating its structure by laser radiation that in turn breaks down the hydrate through heat conduction.

What is claimed is:

1. A tool for removing unwanted gas hydrates, from opaque surfaces of pipes and subsea exploration equipment under water used in subsea oil and gas exploration and production, by laser radiation, the tool comprising:
   a) a main vessel as its housing, holding a volume filled with gases including air or nitrogen;
   b) a power cable inserted into the vessel through a first lid, with the vessel and said power cable linked together by a connector;
   c) a laser device seated on a first base inside said main vessel and connected by a fiber optic cable to an adjustable focus collimator having first and second lenses, said collimator seated on a second base inside said main vessel, with a wavelength emitted by said laser device through the water and the gas hydrates as the water and the gas hydrates are transparent or semi-transparent thereto, and with said wavelength being between 200 nm and 930 nm, whereby when the laser radiation reaches said opaque surfaces of said pipes and subsea exploration equipment, said laser radiation causes heating thereof, which in turn heats said unwanted gas hydrates through conduction, breaking down said unwanted gas hydrates; and
   d) a second lid including a window providing an interface between the vessel and a water medium, with said window being coated on both sides with anti-reflection film matching a refraction index with a medium inside said vessel and anti-reflection film matching a refraction index of said water medium outside said vessel.

2. The tool as set forth in claim 1, wherein said collimator is coated with one or more anti-reflection films, said films comprising fine films deposited on the collimator first and second lenses and windows matching the refraction index of the medium inside the vessel.

3. The tool as set forth in claim 1, wherein said window comprises a lens.

4. The tool as set forth in claim 1, wherein said window is flat.

5. The tool as set forth in claim 1, where the collimator first and second lenses are arrayed in a manner that directs, focuses, spreads or collimates the laser radiation towards a specific target area of the gas hydrates under water to be heated.

6. A method for removing unwanted gas hydrate formations from opaque surface of subsea oil exploration and production pines equipment under water through the use of a tool, said method being comprising:
   providing said tool, said tool comprising:
   a) a main vessel as its housing, holding a volume filled with gases including air or nitrogen;
   b) a power cable inserted into the vessel through a first lid, with the vessel and said power cable linked together by a connector;
   c) a laser device seated on a first base inside said main vessel and connected to an adjustable focus collimator seated on a second base inside said main vessel by a fiber optic cable, with a wavelength emitted by said laser device through the water and the gas hydrates as the water and the gas hydrates are transparent or semitransparent thereto, and with said emitted wavelength being between 200 nm and 930 nm, whereby when the laser radiation reaches said opaque surfaces of the production pipes said subsea exploration equipment, the laser radiation causes heating thereof, which in turn heats said unwanted gas hydrates through conduction, breaking down said unwanted gas hydrates; and
   d) a second lid including a window providing an interface between the vessel and a water medium, with said window being coated on both sides with anti-reflection film matching a refraction index with a medium inside said vessel and anti-reflection film matching a refraction index of said water medium outside said vessel;
   directing said tool, under water close to the opaque surfaces of said subsea exploration and production pipes equipment with the unwanted gas hydrates formation to be removed;
   generating and directing the laser radiation generated by said tool using a selected wavelength to which the gas hydrates to be removed and the water are transparent or semi-transparent;
   whereby the energy of the laser radiation heats the opaque surfaces of the subsea and production pipes equipment that in turn transfers heat to the gas hydrate formations, for the length of time required to remove the gas hydrate formations from the opaque surfaces of the subsea and production pipes equipment.

* * * * *